Dec. 24, 1957 J. MERCIER 2,817,361
PISTON ACCUMULATOR
Filed Feb. 10, 1953 2 Sheets-Sheet 1
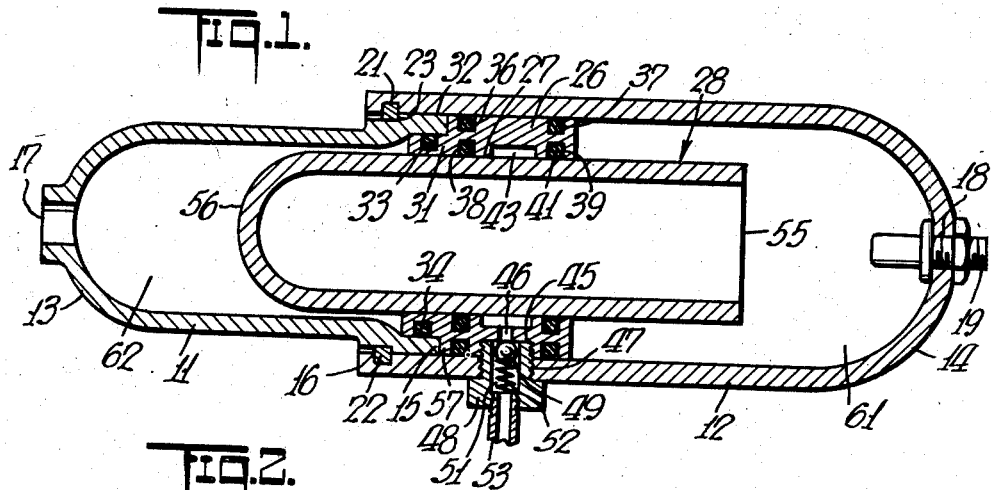
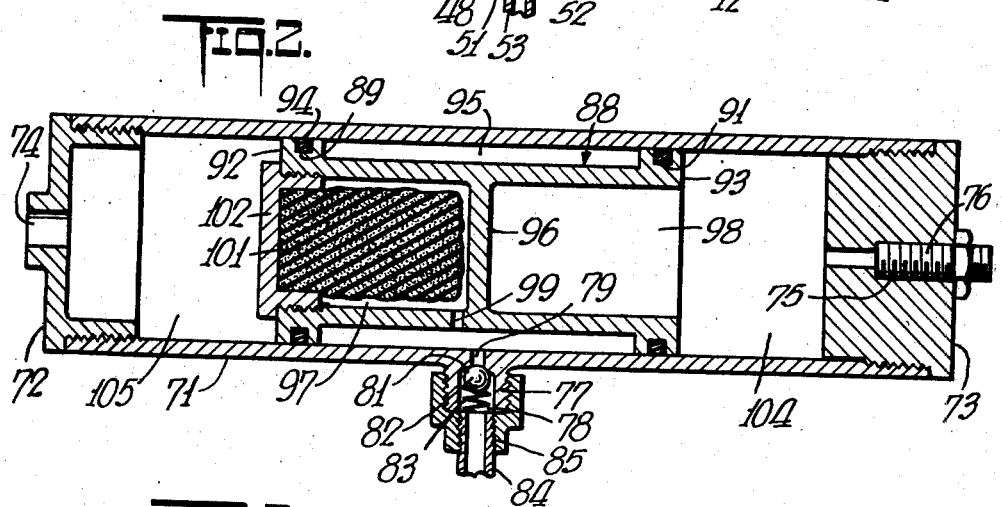
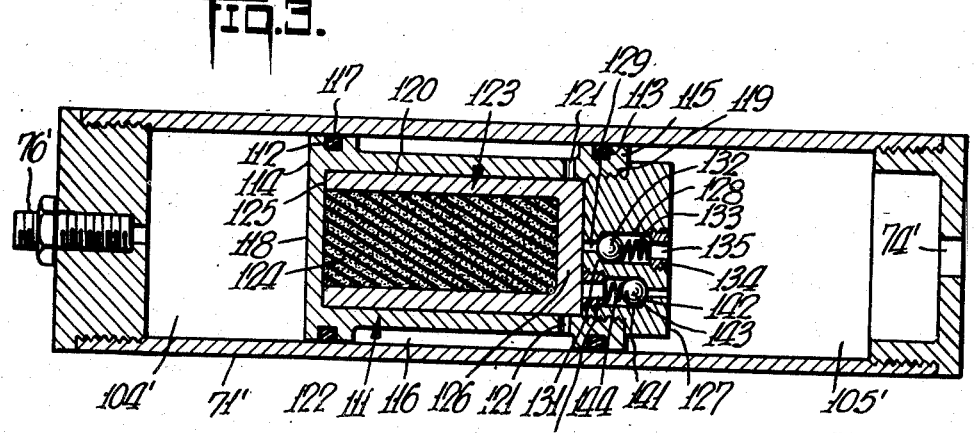
INVENTOR
Jean Mercier
BY
Dean Fairbank & Hirsch
ATTORNEYS Dec. 24, 1957  J. MERCIER  2,817,361
PISTON ACCUMULATOR
Filed Feb. 10, 1953
2 Sheets-Sheet 2
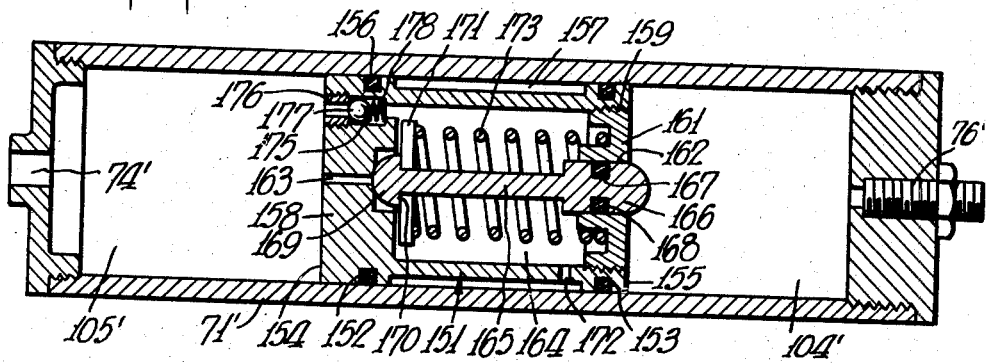
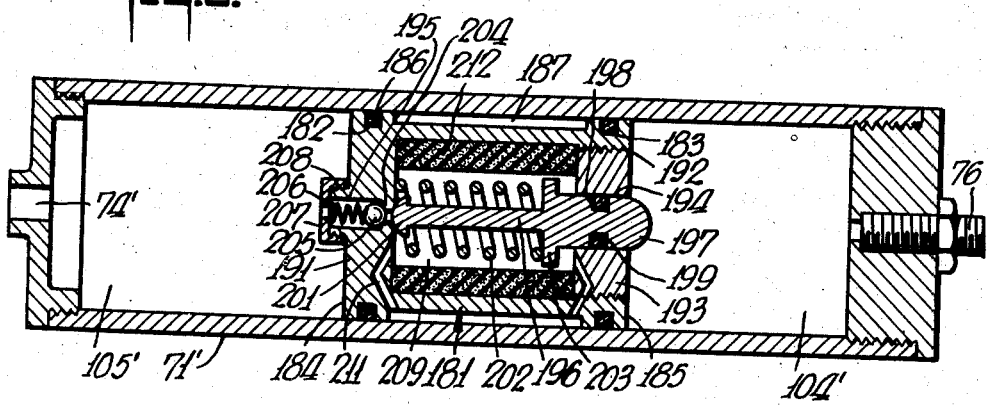
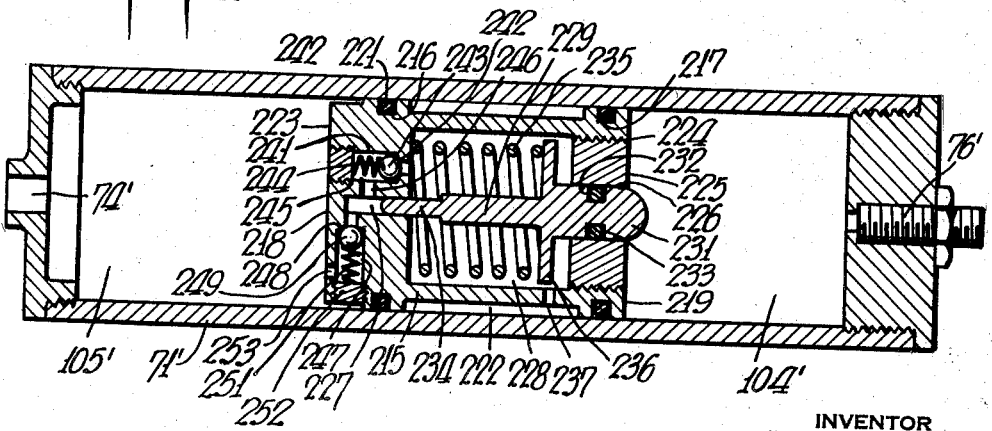
INVENTOR
Jean Mercier
BY
Dean Fairbank & Hirsch
ATTORNEYS United States Patent Office 2,817,361
Patented Dec. 24, 1957

2,817,361
PISTON ACCUMULATOR
Jean Mercier, New York, N. Y.
Application February 10, 1953, Serial No. 336,054
7 Claims. (Cl. 138—31)

This invention relates to piston type pressure accumulators and more particularly to the piston seal between the gas and liquid chambers of the accumulator.

As conductive to an understanding of the invention, it is noted that unless a dependable seal is provided for the piston between the gas and liquid chambers of a piston type pressure accumulator, the resultant leakage of liquid into the gas chamber necessitates frequent servicing of the accumulator for draining of such liquid and the leakage of gas into the liquid chamber and its subsequent entry into the hydraulic system might be detrimental to the proper functioning of the unit to be operated by the accumulator such as for example the hydraulic brakes of a truck which would not operate dependably if a gas bubble entered the unit.

Where a single O ring type seal is used for the piston, the effectiveness of such seal is poor when the pressure on both sides of the piston is identical, as is usually the case in piston type accumulators, for such seal only operates effectively when there is a greater pressure on one side than the other which will force the O ring toward the low pressure side into the space between the piston and the adjacent wall of the accumulator to create an effective seal.

Where two O rings are used on a piston on each side of an annular groove therein, and the annular groove is vented to atmosphere in an attempt to secure a differential between the pressure on opposite sides of each of the rings, as accumulators are generally used under relatively high pressures, the differential is often so great as to cause excessive distortion of the O rings with resultant extrusion between the piston and accumulator wall, so that upon sliding movement of the piston in use of the accumulator, the O rings will rapidly break down with resultant failure of the seal and leakage between the liquid and gas chambers.

Accordingly, it is among the objects of the invention to provide a piston type accumulator which will function without leakage between the gas and liquid chambers and without likelihood of injury to the resilient sealing means between the piston and the wall of the accumulator even after long periods of use, which accumulator is relatively simple in construction having but few parts, none of which are delicate or likely to become deranged and which may readily be assembled and disassembled for cleaning and maintenance.

Another object is to provide an accumulator of the above type which will permit a predetermined differential between the pressure on opposed sides of the resilient sealing means, which pressure during normal operation of the accumulator is considerably less than the difference between atmospheric pressure and the pressure in the liquid and gas chambers.

Another object provides an accumulator of the above type which upon attainment of a predetermined pressure on the inner sides of the resilient sealing means will permit discharge of fluid into the liquid chamber of the accumulator to retain such pressure at no greater than the predetermined amount.

According to the broad aspect of the invention, a pair of resilient seals encompasses the periphery of a piston type accumulator and are positioned on each side respectively of an annular groove associated with the periphery of said piston. Valve means are provided, operatively connected to such annular groove and adapted to discharge fluid therefrom when a predetermined pressure has been attained therein.

In the accompanying drawings in which are shown one or more of various possible embodiments of the several features of the invention, Figs. 1 to 6 are longitudinal sectional views of different illustrative embodiments of the invention.

Referring now to the drawings, the embodiment shown in Fig. 1 desirably comprises a pair of cylindrical shells 11 and 12, each desirably being hemispherical at its outer end as at 13 and 14 respectively and open at its inner end or mouth 15 and 16 respectively. The end 13 of shell 11 desirably has a liquid port 17 and the end 14 of shell 12 desirably has a port 18 with a suitable air valve 19 therein.

Although the shells may be retained together in any suitable manner, in the embodiment herein shown, the shell 12 desirably has an inner diameter greater than that of shell 11 so that it may be positioned thereover. The shell 12 adjacent its mouth 16 desirably has an internal annular groove 21 in which may be positioned a snap ring 22, the latter abutting at its inner periphery against an external annular shoulder 23 adjacent the mouth 15 of shell 11.

Positioned in the shell 12 of the accumulator is an annular sleeve 26 which has a central aperture or bore 27, the elongated wall of which serves as a slide bearing for a piston 28. The sleeve 26 desirably has an external diameter substantially equal to that of shell 12 and has a laterally extending annular flange 31 on one of its sides on the top surface of which may be seated the inner surface of shell 11 adjacent its mouth 15, the outer surface of said shell 11 adjacent its mouth as at 32 having a diameter substantially equal to the inner diameter of shell 12 to fit therein with substantially no transverse play. Desirably the flange 31 has an annular groove 33 in its outer surface in which a suitable resilient seal such as an O ring 34 may be positioned to provide a fluid tight seal between the mouth of shell 11 and the flange 31.

The sleeve 26 desirably has a pair of spaced annular grooves 36 and 37 in its outer periphery and a pair of spaced annular grooves 38 and 39 in its inner periphery. Each of said annular grooves 36 to 39 desirably has a resilient sealing member such as an O ring 41 positioned therein, the O rings in grooves 36 and 37 providing a seal between sleeve 26 and the adjacent inner surface of shell 12 and the O rings in grooves 38 and 39 providing a seal between the inner surface or bore 27 of the sleeve 26 and the outer surface of piston 28.

Desirably the sleeve 26 has an elongated annular groove 43 in its inner periphery positioned between the annular grooves 38 and 39 in which the O rings 41 are placed. The sleeve 26 desirably has an internally threaded cavity 45 in its outer surface in communication with annular groove 43 by means of a transverse bore 46, said cavity 45 being transversely aligned with a correspondingly threaded cavity 47 in the accumulator shell 12 preferably located on the undersurface thereof. A hollow screw 48 is desirably threaded through opening 47 into cavity 45 to retain the sleeve 26 in fixed position with respect to the shell 12. Desirably, a valve is provided to control discharge from annular groove 43 through the hollow sleeve 48. In the illustrative embodiment, such valve may comprise a ball 49 positioned in the bore 51 of the screw and normally retained against the end of the transverse bore 46 to seal the latter by means of a coil spring 52 compressed between the ball 49 and the end of a discharge tube 53 threaded into the bore 51 of the screw 48.

Although the piston 28 may be of any suitable type, in the embodiment herein shown, it desirably comprises a cylindrical shell open at one end as at 55 and closed at its other end as at 56, such closed end being substantially hemispherical to correspond to the curvature of the end 13 of sleeve 11.

To assemble the accumulator shown in Fig. 1, it is merely necessary to position sleeve 26 in shell 12 with the piston 28 extending through the bore 27 of the sleeve as shown. The mouth 15 of shell 11 is then positioned in the mouth 16 of shell 12 so that the end 15 of shell 11 abuts against the shoulder 57 of the sleeve defined by annular flange 31.

The end 16 of shell 12 is moved sufficiently past the end 15 of shell 11 to permit the snap ring 22 to be positioned in annular groove 21 and the shells are then pulled apart until the inner periphery of the snap ring abuts against shoulder 23 of shell 11. The screw 48 is then threaded through the opening 47 in shell 12 into cavity 45 to complete the assembly.

In the operation of the accumulator, shown in Fig. 1, the chamber 61 is charged with air under pressure through valve 19. As a result, the piston 28 will be moved to the left until its end 56 is against the end 13 of shell 11. Liquid such as oil under pressure is then forced through port 17 into chamber 62 to move the piston to the right further compressing the air in chamber 61. The charged accumulator is then used in conventional manner.

When the port 17 is open, by reason of the compressed air in chamber 61, the piston 28 will move to the left forcing fluid from chamber 62 out of port 17 to operate any suitable hydraulic equipment. Such sliding movement of piston 28 will cause a pumping action to force a small quantity of fluid from chamber 62 past the O ring in annular groove 38 into annular groove 43. As a result, the air in groove 43 which is originally under atmospheric pressure, will be compressed. After a few operations of the accumulator and increase of the pressure in annular groove 43 to a predetermined amount, based on the tension of coil spring 52, the ball valve 49 will be unseated to relieve the pressure in annular groove 43 until it has fallen below such predetermined amount at which time the ball will again seat to seal bore 46.

By reason of the positioning of the opening 47 in the bottom of the shell 12, when the ball 49 is moved off its seat, substantially only fluid will be forced from pipe 53 as the air pocket will tend to remain in the top or upper portion of annular groove 43.

O rings efficiently act as seals only when there is a differential pressure on opposed sides thereof, which will force the O ring toward the low pressure side into the space between the piston and adjacent wall of the accumulator to create an effective seal. Thus, when the accumulator shown in Fig. 1 is originally charged, as the air in annular groove 43 will be under substantially atmospheric pressure and as the air in chamber 61 and the fluid in chamber 62 will be under a considerably greater pressure, which may be in the order of 3,000 p. s. i., it is apparent that such differential pressure is provided. However, by reason of the difference between the pressure on opposed sides of the O rings, they would be considerably deformed and possibly extruded between the bore of the sleeve and the piston. Continuous sliding movement of the piston under such conditions would cause rapid deterioration of the O rings and breakdown of the seals.

By reason of the pumping action heretofore described, it is apparent that the pressure of the air in annular groove 43 will quickly rise to reduce the differential between the pressure on the opposed sides of the O rings. The construction herein described ensures that a differential pressure will be maintained at all times for effective sealing action as the pressure in the annular groove 43 is relieved by means of the movement of the ball valve 49 to open bore 46 when such pressure has risen to a predetermined amount which is below the minimum pressure under which the fluid in chamber 62 will be maintained during normal use of the accumulator.

Thus, for example, if the chamber 61 is originally charged with air under pressure of 1,000 p. s. i. and such air is compressed by fluid forced into port 17 to a pressure of 3,000 p. s. i., the spring 52 may be designed to permit unseating of the ball valve when the pressure in annular groove 43 has risen to say 1,000 p. s. i. Thus, since the pressure on the fluid in chamber 62 will not fall to 1,000 p. s. i. until such chamber is substantially empty, a differential pressure no greater than 2,000 p. s. i. will always be provided for dependable sealing action of the O rings, yet such pressure is below that which would cause extrusion of the O rings with the difficulties above pointed out.

The embodiment of the accumulator shown in Fig. 2 desirably comprises a substantially cylindrical sleeve 71 having plugs 72 and 73 screwed in each end thereof, said plugs each having a port 74 and 75 therethrough respectively, the port 75 desirably having an air valve 76 threaded therein. The sleeve 71 desirably has a cylindrical boss 77 extending radially therefrom midway between its ends. The boss 77 desirably has a bore 78 therethrough of reduced diameter at its inner end as at 79 defining a passageway leading into the sleeve and forming a shoulder 81. The passageway 79 is desirably controlled by a valve which in the illustrative embodiment herein may comprise a ball 82 normally urged against the shoulder 81 which forms a valve seat, to seal said passageway 79, by means of a coil spring 83 compressed between the ball and the end of an outlet pipe 84 screwed in the bore 85 of a hollow nut 86 threaded on the boss 77. Desirably, as shown, the passageway 79 is positioned on the undersurface of the sleeve 71 for the purpose hereinafter to be described.

Slidably mounted in the sleeve 71, which forms the shell of the accumulator, is a piston 88 desirably having a pair of spaced annular grooves 89 and 91 in the outer periphery thereof near the ends 92 and 93 of the piston respectively and an elongated annular groove 95 in its outer periphery extending between said annular grooves 89 and 91, each of said grooves 89 and 91 desirably having a resilient seal therein preferably an O ring 94. The piston 88 which desirably is hollow has a transverse central wall 96, defining chambers 97 and 98 on each side, the chamber 97 being in communication with annular groove 95 by means of a transverse bore 99. A secondary pressure accumulator is desirably provided defined by the chamber 97. In the illustrative embodiment such accumulator may comprise a cylindrical block 101 of foam rubber, having one end affixed in a plug 102 threaded into the open end of chamber 97 with its other end extending to nearly the wall 96.

Desirably the length of the piston 88 is such that in either of its extreme positions, i. e., with its end 92 against plug 72 or its end 93 against plug 73, the passageway 79 in shell 71 will still lead into annular groove 95.

In the operation of the accumulator, shown in Fig. 2, air under pressure is first forced through valve 76 to charge chamber 104. As a result, the piston will move to the left. Fluid under pressure greater than that of the air in chamber 104 is forced through port 74 into chamber 105 to move the piston 88 to the right further to compress the air in chamber 104. The accumulator is then ready for use.

In the present condition of the accumulator, as the air in annular groove 95 will be substantially only under atmospheric pressure and the air and fluid in chambers 104 and 105 respectively will be under a considerably greater pressure, a differential will be provided between the pressure on opposed sides of the O rings 94 to provide an effective seal. However, the pressure differential is so great that unless relieved rapidly, the movement of the piston in the use of the accumulator would cause extrusion of the O rings and resultant breakdown of the seals as previously described. This pressure differential is relieved by a few operations of the accumulator, for each time fluid is permitted to escape from port 74 during normal use, the piston 88 will move slightly to the left providing a pumping action which will force fluid into annular groove 95, through port 99 into chamber 97 to compress the foam rubber block 101, thereby increasing the pressure on the air in annular groove 95 and in chamber 97. Such pumping action will quickly increase the pressure in annular groove 95 and in chamber 97 to reduce the differential between the pressure on opposed sides of the O rings. When such pressure in chamber 95 has increased to the desired value to be maintained, the ball 82 will move off its seat to relieve any further pressure increases.

Thus, for example, assuming that the pressure of the air originally charged in chamber 104 is 1,000 p. s. i. and the fluid forced into chamber 105 compresses such air to say 3,000 p. s. i., the spring 83 may be adjusted to exert a force against ball 81 so that it will relieve the pressure in annular groove 95 when the pressure therein rises above 1,000 p. s. i. Thus, the maximum differential pressure in the accumulator will be 2,000 p. s. i. By reason of the foam rubber block 101, added capacity is provided to insure that the ball valve 81 will unseat at the predetermined pressure.

As a result, a desired differential pressure may be provided which, though sufficient to prevent leakage past the O rings, will not be so great as to cause deformation thereof upon sliding movement of the piston.

The embodiments shown in Figs. 3 to 6 desirably utilizes a shell construction substantially identical to that shown in Fig. 2 and corresponding parts have the same reference numerals primed.

In the embodiment shown in Fig. 3, the substantially cylindrical piston 111 slidably mounted in shell 71', desirably has annular grooves 112 and 113 near each end 114 and 115 thereof respectively and an elongated annular groove 116 extending between the annular grooves 112 and 113, each of said annular grooves 112, 113 having a resilient member such as an O ring 117 positioned therein to provide a seal between the piston and the inner surface of shell 71'.

In the illustrative embodiment shown in Fig. 3, the piston 111 is cup-shaped having a transverse wall 118 at its end 114 and having an open mouth 119 at its end 115. Communication is desirably provided between the annular groove 116 and the interior or bore 120 of the piston 111 through radial passageways 121. Positioned in bore 120 is a cup-shaped container 123 desirably of porous bronze to permit passage of fluid therethrough. The container 123 desirably has a compressible member therein preferably a block 124 of foam rubber and is positioned in the bore 120 so that the open mouth 125 of the container 123 is adjacent wall 118 of the piston and the wall 126 of the container 123 is adjacent the mouth 119 of the piston. The container is desirably retained in the bore of the piston by means of a plug 127 threaded into its mouth 119.

The plug 127 desirably has an axial bore 128 therethrough of reduced diameter at its inner end as at 129 defining a shoulder 131 which forms a seat for a valve head illustratively a ball 132. The ball is desirably retained against its seat by means of a coil spring 133 compressed between the ball and the end of a hollow screw 134 threaded into the bore 128 and having an axial opening 135 therethrough. In the preferred embodiment shown, the plug 127 may have a second bore 141 therethrough radially displaced from bore 128 and of reduced diameter as at 142 at its outer end defining a seat for a valve head preferably also a ball 143 retained against its seat by a coil spring 144 compressed between the ball and the end of a hollow screw 130 in said bore 141.

In the operation of the accumulator shown in Fig. 3, air under pressure is forced into chamber 104' through air valve 76'. As a result, the piston 111 will be moved to the right. Fluid under pressure greater than that of the air in chamber 104' is forced into chamber 105' through port 74'. Consequently, the piston 111 will be moved to the left further to compress the air in chamber 104'.

Where the accumulator shown in Fig. 3 is used for relatively low pressures say, for example, where the air in chamber 104' is initially under a pressure of 1,000 p. s. i. and the fluid, when forced through port 74', compresses such air to a maximum of 3,000 p. s. i., if the spring 144 exerts a force against ball 143 which requires more than 3,000 p. s. i. in chamber 105' to move the ball 143 off its seat, the port 142 will remain sealed.

As fluid is permitted to escape from port 74', during operation of the accumulator, the movement of the piston 111 to the right will provide a pumping action to force fluid into annular groove 116 and through passageways 121 and porous container 123 quickly to compress the foam rubber block 124 and also to compress the air in said container and in annular groove 116. After a few slight movements of the piston, the pressure in annular groove 116 will rise to reduce the differential between the pressure originally present on opposed sides of the O ring and such differential is also reduced by reason of the fact that the pressure of the air in chamber 104' will also fall as the piston 111 moves to the right.

As the ball 132 is retained on its seat 131 by the combined force exerted by spring 133, and the pressure on the fluid in chamber 105', it is apparent that for the ball 132 to move off its seat the pressure in annular groove 116 must rise sufficiently to overcome both the fluid pressure and the spring pressure, i. e. to a pressure greater than that in chamber 105'.

To prevent too great a differential in pressure, which might cause extrusion of the O rings as previously pointed out, the spring 133 is of such strength that when the pressure in annular groove 116 exceeds the pressure in chamber 105' by a given amount say 1,000 p. s. i., the ball 132 will be moved off its seat 131 and the pressure will be relieved by discharge of fluid by the expanding foam rubber block through the porous wall 126 and bore 128 into the fluid chamber 105', such flow being permitted by reason of the fact that the pressure in the annular groove 116 is greater than that in the chamber 105'.

Where the accumulator, shown in Fig. 3, is used in high pressure systems, such as when the fluid in chamber 105' is originally forced therein under a pressure of say 9,000 p. s. i., as the spring 144 is set, illustratively to 3,000 pounds, ball 143 will be unseated and fluid will flow into container 123 and annular groove 116 almost immediately. As a result, the foam rubber block 124 will be compressed and when the pressure on the fluid in annular groove 116 has reached 6,000 pounds, this pressure plus the spring pressure of 3,000 pounds will close valve 143. As a result, upon initial charging of the accumulator with fluid, the differential pressure on the O rings will only be 3,000 pounds which will not cause injury thereto.

In the embodiment shown in Fig. 4, a substantially cylindrical piston 151 is slidably mounted in shell 71'. The piston desirably has a pair of spaced annular grooves 152 and 153 near each of its ends 154 and 155 respectively, and an elongated annular groove 157 extending between the annular grooves 152, 153, a resilient sealing member such as an O ring 156 desirably being positioned in each of such annular grooves 152, 153. The piston 151 is desirably cup-shaped, having a wall 158 at its end 154 and having an open mouth 159 at its end 155, the mouth 159 being desirably sealed by a threaded plug 161 having an axial bore 162 therethrough desirably longitudinally aligned with an axial bore 163 through end wall 158, the diameter of bore 163 being small as compared to the diameter of bore 162 to minimize reaction due to variations in the liquid pressure.

Positioned in the bore 164 of piston 151 is a rod 165 desirably of enlarged diameter at one end as at 166, said enlarged diameter end 166 being slidable in bore 162 with substantially no transverse play and desirably having an annular groove 167 in which an O ring 168 is positioned to provide a seal between the wall of bore 162 and the outer surface of enlarged portion 166. The other end of rod 165 is also desirably of enlarged diameter as at 169 defining a shoulder 170 against which is positioned a split type washer 171. The enlarged portion 169 of the rod 165 is normally urged to seal bore 163 by means of a coil spring 173 compressed between washer 171 and the inner surface of plug 161.

Desirably, the bore 164 of the piston 151 is in communication with annular groove 157 by means of a radial bore 172. The end wall 158 of the piston desirably has a bore 175 extending therethrough and radially displaced from bore 163. Bore 175 desirably has a hollow plug 176 screwed in the outer end thereof which defines a seat for a ball valve 177 normally retained against said seat by a coil spring 178 in bore 175.

In the operation of the embodiment shown in Fig. 4 as in the previous embodiments heretofore described, air under pressure is forced through air valve 76', into chamber 104'. As a result, the piston 151 will be moved to the left. By reason of the pressure exerted against the end 166 of rod 165, together with the force exerted by spring 173, the end 169 of rod 165 will be retained in sealing position with respect to bore 163. Assuming that the accumulator is to be used at a maximum pressure of 3,000 p. s. i., fluid is forced through inlet port 74', into chamber 105' under greater pressure than that of the air in chamber 104', i. e., which is initially say at 1,000 p. s. i. As a result, the piston will be moved to the right further compressing the air in chamber 104'. As the pressure in fluid chamber 105' is substantially equal to that of the air chamber 104', the bore 163 will remain sealed by reason of the added force of spring 173 which retains end 169 in sealing relationship to such bore 163.

At this time, the pressure in annular groove 157 and in bore 164 of the piston 151 is substantially equal to atmospheric pressure. The spring 178 desirably exerts a force of slightly greater than 2,000 pounds against ball 177 to retain the latter seated against the pressure of 2,000 pounds on the fluid.

After a few operations of the accumulator which will discharge fluid from port 74', the successive movements of the piston to the left will provide a pumping action which will force fluid into annular groove 157 and bore 164 to increase the pressure therein, thereby decreasing the differential between the pressure on opposed sides of the O rings 156. Such movements of the piston will also cause the air pressure and consequently the fluid pressure to be reduced to below the maximum original pressure of 3,000 p. s. i.

As long as the pressure in the piston bore 164 and annular groove 157 is less than the air pressure in chamber 104', the bore 163 will remain sealed. As the pumping action continues with use of the accumulator, the pressure in the piston will quickly rise to a value above the air pressure. Thus, a differential between the pressure on opposed sides of the O ring will still be maintained with the pressure being greater on the inner side of said O rings. When the pressure in the piston rises to an amount such that the force exerted against rod 165 to move it to the right is greater than the spring force plus the force exerted against rod 165 by the air pressure in chamber 104' against end 166, the rod will move to the right to open bore 163 thereby relieving the pressure in the piston. The bore 163 will again close when the piston pressure has been sufficiently relieved and the tension of spring 173 is such that the differential pressure on the O rings will not exceed a predetermined amount.

Where the accumulator, shown in Fig. 4, is used under high pressures, such as when the fluid is initially forced into chamber 105' under a pressure of say 9,000 p. s. i., the bore 163 will remain closed as the pressure in air chamber 104' plus the pressure of spring 173 will retain enlarged member 168 in sealing position. As spring 178 exerts a force of say 3,000 pounds, the fluid in chamber 105' which is under such pressure of 9,000 p. s. i., will move ball 177 off its seat and fluid will flow into the piston bore 164 to compress the air therein as well as the air in annular groove 157 to a pressure of 6,000 pounds at which time ball 177 will seat and thus the maximum differential between the pressure on opposed sides of the O rings 156 will not exceed 3,000 pounds.

The accumulator when used under high pressure will function in the same manner as previously described when used with low pressure, that is, the pressure in the piston bore 164 and groove 157 will quickly increase to above the pressure in the air and fluid chambers 104', 105' and be retained at a maximum predetermined pressure by the relief through bore 163.

In the embodiment shown in Fig. 5, a substantially cylindrical piston 181 is slidably mounted in shell 71'. This piston desirably has a pair of spaced annular grooves 182 and 183 near its ends 184 and 185 respectively, and an elongated annular groove 187 extending between the annular grooves 182 and 183, a resilient sealing member such as an O ring 186 desirably being positioned in each of such annular grooves 182, 183. The piston 181 is desirably cup-shaped, having a wall 191 at its end 184 and having an open mouth 192 at its end 185, the mouth 192 being desirably sealed by a threaded plug 193 having an axial bore 194 therethrough desirably longitudinally aligned with axial bore 195 through end wall 191.

Positioned in the bore 209 of piston 181 is a rod 196 desirably of enlarged diameter at one end as at 197, said enlarged diameter end 197 being slidably in bore 194 with substantially no transverse play and desirably having an annular groove 198 in which an O ring 199 is positioned to provide a seal between the wall of bore 194 and the outer surface of enlarged portion 197. The other end of rod 196 is also desirably of enlarged diameter as at 201. The enlarged portion 201 of rod 196 is normally urged away from bore 195 by means of a coil spring 202 encompassing said rod and compressed between wall 191 and an annular shoulder 203 rigid with said rod. The bore 195 desirably is of reduced diameter at its inner end defining a seat 204 against which is positioned a ball 205, the latter being retained on its seat by means of a coil spring 206 in said bore compressed between the ball and a ported cap 207 threaded on an annular boss 208 about said bore 195.

Desirably the bore 209 of the piston is in communication with annular groove 187 by means of a passageway 211, and a sleeve 212 of resilient material such as foam rubber may be positioned in bore 209 encompassing the coil spring 202 and being normally spaced therefrom as shown.

In the operation of the embodiment shown in Fig. 5, as in the previous embodiments heretofore described, air under pressure is forced through air valve 76' into chamber 104'. As a result, the piston 181 will be moved to the left. Assuming that the accumulator is to be used under a maximum pressure of 3,000 p. s. i., fluid is forced through inlet port 74' into chamber 105' under greater pressure than that of the air in chamber 104' which is initially at say 1,000 p. s. i. By reason of the ball valve 205, no fluid will be forced into the piston bore 209 when chamber 105' is initially charged. As a result, the piston will be moved to the right further compressing the air in chamber 104'. As at this time the air in the piston bore 209 and groove 187 is substantially at atmospheric pressure, much less than the pressure in chamber 104', the force exerted by the air against the enlarged end 197 of rod 196 will overcome the atmospheric pressure plus the force exerted by spring 202 to move enlarged portion 201 to seal bore 195.

After a few operations of the accumulator which will discharge fluid from port 74', the successive movements of the piston to the left will provide a pumping action which will force fluid into annular groove 187 and through passageway 211 into bore 209 quickly to increase the pressure therein which will cause compression of the foam rubber sleeve 212 and also increase the differential between the pressure on opposed sides of the O rings 186. Such movements of the piston will also cause the air pressure and consequently the fluid pressure in chambers 104 and 105 respectively to be reduced below the maximum original pressure of 3,000 p. s. i.

As long as the pressure in the piston bore 209 and annular groove 187 plus the force exerted by spring 202 is less than the force provided by the pressure in air chamber 104', against the enlarged end 197 of rod 196, bore 195 will remain sealed. As the pumping action continues with use of the accumulator, the pressure in the piston bore will rise sufficiently so that combined with spring 202 it will overcome the pressure of the air in chamber 104' and the rod 196 will be moved to the right to move enlarged portion 201 away from bore 195. However, as long as the pressure of the oil in the chamber 105' is greater than that in the piston bore 209 and groove 185, ball 205 will remain seated so that no fluid can flow out of the piston.

As the pumping action continues, the pressure in the piston bore and groove 187 will quickly rise to a value above that of the fluid pressure in chamber 105'. Thus, a differential between the pressure on opposed sides of the O ring will still be maintained with the pressure being greater on the inner side of said O rings. When the pressure in the piston rises to an amount such as to exceed the pressure in the fluid chamber by greater than the force exerted by spring 206, the ball 205 will be moved off its seat for relief of pressure from the piston bore 209 and groove 187 and such ball will again seat. The spring 206 may exert such force, for example, that it requires a pressure of 1,000 p. s. i. to move ball 205 off its seat. Thus, the differential between the pressure on opposed sides of the O rings will never fall below this amount once it is attained during normal operation.

In the embodiment shown in Fig. 6, a substantially cylindrical piston 215 is slidably mounted in shell 71'. The piston desirably has a pair of spaced annular grooves 216 and 217 near each of its ends 218 and 219 respectively, and an elongated annular groove 222 extending between the annular grooves 216 and 217, a resilient sealing member such as an O ring 221 desirably being positioned in each of said annular grooves 216, 217.

The piston 215 is desirably cup-shaped, having a wall 223 at its end 218 and having an open mouth 224 at its end 219, the mouth 224 being desirably sealed by a threaded plug 225 having an axial bore 226 therethrough desirably longitudinally aligned with an axial elongated cavity 227 extending from the inner surface of wall 223. Positioned in the bore 228 of piston 215 is a rod 229 desirably of enlarged diameter at one end as at 231, said enlarged diameter end 231 being slidable in bore 226 with substantially no transverse play and desirably having an annular groove 232 in which an O ring 233 is positioned to provide a seal between the wall of bore 226 and the outer surface of enlarged portion 231. The other end of rod 229 is of reduced diameter as at 234 and fits snugly in bore 227, yet free to slide therealong, said reduced portion 234 acting as a pump piston in the manner hereinafter to be described.

The reduced portion 234 is normally urged to retracted position in bore 227 by means of a coil spring 235 encompassing rod 229 and compressed between the inner surface of wall 223 and a flange 236 rigid with said rod. Desirably the bore 228 of the piston is in communication with annular groove 222 by means of a radial bore 237.

The end wall 223 of the piston desirably has a bore 241 extending therethrough radially displaced from bore 227 and of reduced diameter at its inner end defining a ball seat 242. A ball 243 in said bore 241 is normally retained against said seat by a coil spring 244 compressed between the ball and a plug 245 threaded into bore 241. Bore 241 is in communication with bore 227 through a radial bore 246 and bore 227 is in communication with a transverse bore 247 in end wall 223, said transverse bore being of reduced diameter at its inner end defining a ball seat 248. A ball 249 in bore 247 is normally retained against its seat by a coil spring 251 compressed between the ball and a plug 252 threaded in the end of the bore 247, a passageway 253 being provided between said bore 247 and the fluid chamber 105'.

In the operation of the embodiment shown in Fig. 6 as in the previous embodiments heretofore described, air under pressure is forced through air valve 76' into chamber 104'. As a result, piston 215 will move to the left. Assuming that the accumulator is to be used under a pressure of 3,000 p. s. i., fluid is forced through inlet port 74' into chamber 105' under greater pressure than that of the air in chamber 104' which is initially, say at 1,000 p. s. i. As a result, the piston 215 will be moved to the right further compressing the air in chamber 104'. By reason of the ball valve 249, which seals bore 247, no fluid will flow therethrough when the fluid chamber is originally charged.

As the pressure in bore 228 and annular groove 222 is originally atmospheric, by reason of the pressure exerted against the enlarged end 231 of rod 229, such rod will be moved to the left against the tension of coil spring 235.

After a few operations of the accumulator which will discharge fluid from port 74', the successive movements of the piston to the left will provide a pumping action which will force fluid into annular groove 222 and bore 228 to increase the pressure therein, thereby decreasing the differential between the pressure on opposed sides of the O ring. Such movements of the piston will also cause the air pressure and consequently the fluid pressure in chambers 104' and 105' to be reduced to below the maximum original pressure of 3,000 p. s. i.

When the pressure in the piston bore 228 and in annular groove 222 increases to an amount such that the piston pressure plus the force exerted by spring 235 will overcome the pressure in the air chamber 104' against end 231 of the rod 229, such rod will move to the right. As a result of the outward movement of end 234 of rod 229 from bore 227, a suction action will be created in bore 227 which will move ball 243 off its seat to draw fluid from the piston bore 228 into said bore 227. As the result of such flow of fluid, the pressure in the piston bore 228 and annular groove 222 will drop so that the air pressure in air chamber 104 will again move the rod 229 to the left. This will force the fluid in bore 227 through the reduced portion of bore 247 to move ball 249 off its seat for discharge of fluid into the liquid chamber. It is apparent from the foregoing that although the piston pressure is less than that of the fluid pressure in chamber 105', the pumping action will force fluid from the piston bore 228 and groove 222 into the fluid chamber 105'. After such fluid has been discharged, the ball 249 will again seat.

Thus, with each movement of the piston and rise of the piston pressure above a predetermined amount, a pumping action will be provided to eject fluid from the piston bore thereby maintaining a maximum desired differential pressure between opposed sides of the O ring.

With the construction above described, a maximum differential is provided between the pressure on opposed sides of the O rings to ensure dependable sealing action yet without such distortion of the O ring seals which might cause extrusion thereof with resultant breakdown and failure of the seal.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure accumulator comprising a cylinder having a gas inlet port and a liquid port, a piston slidably mounted in said cylinder intervening between said ports and defining a gas chamber and a liquid chamber, said piston having a pair of spaced annular grooves in its periphery and a third elongated annular groove interposed between said pair of annular grooves, said piston having a bore therein with a wall at each end exposed in said gas chamber and said liquid chamber respectively, said bore being in communication with said elongated annular groove, the wall in said liquid chamber having a pair of passageways therethrough providing communication between said liquid chamber and the bore in said piston, one-way valve means in each of said passageways controlling flow of fluid therethrough, one of said valve means permitting flow in direction from said bore into said liquid chamber and the other of said passageways permitting flow from said liquid chamber into said bore, resilient means normally retaining each of said valve means in closed position with respect to said passageways, and a resilient deformable annular seal in each of said pair of spaced annular grooves, said seals engaging the inner wall of said cylinder, whereby said valve means are adapted to relieve the pressure against said annular seals to prevent extrusion.

2. The combination recited in claim 1 in which compressible means are provided in said bore of said piston.

3. The combination recited in claim 2 in which said compressible means comprises a resilient rubber member.

4. The combination recited in claim 2 in which said compressible means comprises a resilient foam rubber member.

5. The combination set forth in claim 1 in which a cup-shaped member of porous material is positioned in the bore of said piston, the floor of said cup-shaped member being adjacent the inner surface of the wall in said liquid chamber.

6. The combination set forth in claim 1 in which a cup-shaped member of porous material is positioned in the bore of said piston, the floor of said cup-shaped member being adjacent the inner surface of the wall in said liquid chamber, and a block of compressible material is positioned in said cup-shaped porous member.

7. A pressure device comprising a cylinder having a gas inlet port and a liquid port, a piston slidably mounted in said cylinder intervening between said ports and defining a gas chamber and a liquid chamber, said piston having a wall at each end exposed in said gas chamber and said liquid chamber respectively, the wall in said liquid chamber having a pair of passageways therethrough, said piston having a pair of spaced annular grooves in its periphery and a third elongated annular groove interposed between said pair of annular grooves and in communication with said passageways, one-way valve means in each of said passageways controlling flow of fluid therethrough, one of said valve means permitting flow in direction from said elongated annular groove into said liquid chamber and the other of said passageways permitting flow from said liquid chamber into said elongated annular groove, resilient means normally retaining each of said valve means in closed position with respect to said passageways, and a resilient deformable annular seal in each of said pair of spaced annular grooves, said seals engaging the inner wall of said cylinder, whereby said valve means limit the differential pressure against said annular seal adjacent said gas chamber to prevent extrusion.

References Cited in the file of this patent

UNITED STATES PATENTS

| | | |
|---|---|---|
| 2,064,969 | Carr et al. | Dec. 27, 1936 |
| 2,587,091 | Barnes et al. | Feb. 26, 1952 |
| 2,592,613 | Snyder | Apr. 15, 1952 |
| 2,615,769 | Barnes et al. | Oct. 28, 1952 |
| 2,683,467 | Greer | May 23, 1952 |